United States Patent [19]

Corrigan et al.

[11] Patent Number: 5,527,866
[45] Date of Patent: Jun. 18, 1996

[54] PROCESS FOR MAKING SOLID POLYOL POLYESTER POLYMER

[75] Inventors: Patrick J. Corrigan, Cincinnati; John K. Howie, Oregonia, both of Ohio

[73] Assignee: The Procter & Gamble Company, Cincinnati, Ohio

[21] Appl. No.: 408,810

[22] Filed: Mar. 23, 1995

Related U.S. Application Data

[60] Division of Ser. No. 301,947, Sep. 7, 1994, which is a continuation-in-part of Ser. No. 968,791, Oct. 30, 1992, abandoned.

[51] Int. Cl.⁶ .............................. C08F 22/14; C08F 22/20
[52] U.S. Cl. .................. 526/75; 526/227; 526/238.23; 526/320
[58] Field of Search .................. 526/75, 227, 238.23, 526/320; 525/329.5, 338

[56] References Cited

U.S. PATENT DOCUMENTS

| | | | |
|---|---|---|---|
| 2,588,902 | 9/1950 | Wiebe | 260/405.6 |
| 3,963,699 | 6/1976 | Rizzi | 536/119 |
| 4,005,195 | 1/1977 | Jandacek | 424/180 |
| 4,005,196 | 1/1977 | Jandacek | 424/180 |
| 4,517,360 | 5/1985 | Volpenhein | 536/119 |
| 4,518,772 | 5/1985 | Volpenhein | 536/119 |
| 4,797,300 | 11/1989 | Jandacek | 426/549 |
| 4,888,195 | 12/1989 | Huhn et al. | 426/601 |
| 5,006,351 | 4/1991 | Klemann et al. | 426/611 |
| 5,422,131 | 6/1995 | Elsen et al. | 426/531 |

OTHER PUBLICATIONS

Clingman, A. L. et al., *The Chemistry of Polymerized Oils. II. Dehydro–Polymers of Methyl Linoleate and Methyl Stearate*, JAOCS, Feb., 1953, pp. 53–56.

Paschke, R. F. et al., *Dimer Acid Structures. The Dehydro–Dimer from Methyl Oleate and Di–t–Butyl Peroxide*, JAOCS, Jan., 1964, pp. 56–60.

*Initiators*, Kirk Othmer Encyclopedia of Science and Technology, vol. 13, pp. 355–373.

Henry et al., *Characterization of Used Frying Oils of Olestra and Triglyceride Part 2 Comparison*, JAOCS, vol. 69, No. 6 pp. 509–519 (Jun. 1992).

Gardner et al., *Characterization of Used Frying Oils Part 1 Isolation and Identification of Compound Classes*, JAOCS, vol. 69, No. 6 pp. 499–508 (Jun. 1992).

*Primary Examiner*—Patricia A. Short
*Attorney, Agent, or Firm*—Tara M. Rosnell; George W. Allen; Rose Ann Dabek

[57] ABSTRACT

Nondigestible fat compositions useful as replacements for triglyceride fats or oils in foods are disclosed. These compositions have relatively flat solid Fat Content (SFC) profile slopes between typical room temperature and body temperature. The nondigestible fat compositions comprise a liquid nondigestible oil and nondigestible solid polyol polyester particles dispersed in the oil in an amount sufficient to control passive oil loss. The solid polyol polyester particles of the composition herein comprise from about 10% to 50% polyol polyester polymer and from 50% to about 90% polyol polyester monomer. The polyol polyester material which forms these solid particles must contain a relatively high proportion of long chain saturated fatty acid ester groups. Edible fat-containing products comprising these nondigestible fats can be less waxy tasting due to the lower level of solids required for passive oil loss control.

6 Claims, 2 Drawing Sheets

PROCESS FOR MAKING SOLID POLYOL POLYESTER POLYMER

This is a division of application Ser. No. 08/301,947, filed on Sep. 7, 1994, now pending, which is a Continuation-in-part of application Ser. No. 07/968,791 filed Oct. 30, 1992, now abandoned.

TECHNICAL FIELD

The present invention relates to nondigestible fat compositions that are useful as full or partial replacers for triglyceride fats or oils in foods. More particularly, the present invention provides such nondigestible fat compositions that provide passive oil loss control without being excessively waxy tasting.

BACKGROUND OF THE INVENTION

Certain polyol fatty acid polyesters have been suggested as low or reduced calorie substitutes for triglyceride fats and oils used in foods. For example, nonabsorbable, nondigestible sugar fatty acid esters or sugar alcohol fatty acid esters having at least 4 fatty acid ester groups with each fatty acid having from 8 to 22 carbon atoms have been used as partial or full fat replacers in low calorie food compositions. (See Mattson & Volpenhein, U.S. Pat. No. 3,600,186; Issued Aug. 17, 1971.) Foods in which these polyol polyesters are particularly useful as partial or complete replacements for triglyceride fats or oils include products suitable for use in frying. Unfortunately, regular ingestion of moderate to high levels of completely liquid forms of these polyol polyesters can produce undesirable passive oil loss, namely, leakage of the polyesters through the anal sphincter. By contrast, completely solid versions of these polyesters provide a sufficiently high solids content at mouth temperatures (e.g., 92° F., 33.3° C.) such that they give a waxy taste or impression in the mouth when ingested.

As an alternative to these completely liquid or completely solid nondigestible/nonabsorbable polyol polyesters, certain intermediate melting polyol fatty acid polyesters have been developed that provide passive oil loss control, while at the same time reducing waxiness in the mouth. (See Bernhardt; European Patent Application Nos. 236,288 and 233,856; Published Sep. 9, and Aug. 26, 1987, respectively.) These intermediate melting polyol polyesters exhibit a unique rheology at body temperature by virtue of their having a matrix which involves a minimal level of solids (e.g. about 12% or lower) that bind the remaining liquid portion. As a result, these intermediate melting polyol polyesters are sufficiently viscous and have a sufficiently high liquid/solid stability at body temperature to provide passive oil loss control. An example of such intermediate melting polyol polyesters are those obtained by substantially completely esterifying sucrose with a 55:45 mixture of fully hydrogenated (hardstock) and partially hydrogenated soybean oil fatty acid methyl esters. (See Examples 1 and 2 of the above European patent applications.)

These intermediate melting polyol polyesters can be used as total or partial replacements for other fats and oils in various food products, including cooking and frying oils. However, it has been found that certain foods such as potato chips fried in frying fats containing substantial levels of these nondigestible intermediate melting polyol polyesters, particularly at levels in excess of about 40%, can give a significantly increased waxiness impression compared to potato chips that have been fried in the digestible triglyceride fat or oil that the nondigestible polyol polyester has partially replaced. (In terms of physical properties, "waxiness" relates to how the fat composition is sensed in the mouth, and specifically relates in part to the sensation of the product having a relatively high level of solids.) Indeed, this increased waxiness impression with regard to these intermediate melting polyol polyesters is recognized in the aforementioned European Patent Application No. 233,856 in as much as that application discloses fat compositions which contain digestible food materials, such as triglycerides and substituted mono- and diglycerides, that act as solvents for the intermediate melting polyol polyesters. However, as the proportion of triglycerides is increased relative to the intermediate melting polyol polyesters so as to impart less waxiness, the caloric content of the frying fat also increases accordingly. In addition, it has been found that frying fats containing greater than about 40% of these intermediate melting polyol polyesters can adversely affect the flavor display of the resulting fried food, in particular potato chips.

The waxiness impression imparted by intermediate melting polyol polyesters such as those of the aforementioned European '288 and '836 applications is believed to be due at least in part to their change in Solid Fat Content (SFC), particularly between typical room temperature (i.e. 70° F., 21.1° C.) and body temperature (i.e. 98.6° F., 37° C.). For example, the intermediate melting sucrose polyester of Example 2 of European Patent Application Nos. 233,856 and 236,128 has an SFC profile slope (as hereinafter defined) between room temperature and body temperature of about −1.3. In other words, the SFC profile slope of these intermediate melting polyol polyesters is relatively steep. Given this relatively steep SFC profile slope, the change in solids content of these intermediate melting polyol polyesters can be sufficiently great such that a high level of solids will be sensed when such room temperature materials are first placed in the mouth, thereby leading to an increased waxiness sensation.

Blends of completely liquid polyol polyesters with completely solid polyol polyester hardstocks, preferably esterified with $C_{10}$–$C_{22}$ saturated fatty acids (e.g. sucrose octastearate), have also been proposed in order to provide passive oil loss control. (See, for example, Jandacek; U.S. Pat. No. 4,005,195; and Jandacek/Mattson; U.S. Pat. No. 4,005,196; Both issued Jan. 25, 1977.) Blends of these liquid polyol polyesters and solid polyol polyesters hardstocks have relatively flat SFC profile slopes between typical room temperature and body temperature, i.e. slopes of from 0 to about −0.3, and more typically from 0 to about −0.1. In other words, there is little or no change in the solids content of these blends between room temperature and body temperature.

Although providing at least temporary passive oil loss control, blends of liquid polyol polyesters and solid polyol polyester hardstocks according to the aforementioned U.S. Pat. Nos. '195 and '196 patents do not necessarily provide passive oil loss control over an extended period of time. It has been found that these solid polyol polyester hardstocks normally tend to form large spherulitic particles (typically from about 3 to about 32 microns in size) in the liquid polyol polyesters. These large spherulitic particles may tend to phase separate from the liquid polyol polyesters during storage of such blends. As a result, a two-phase system can develop with the liquid portion thereof providing minimal or no passive oil loss control.

In addition, blends of liquid polyol polyesters and solid polyol polyester hardstocks according to the aforementioned U.S. Pat. Nos. 4,005,195 and 4,005,196 do not necessarily lead to less waxy tasting products. As taught in these patents, a relatively high level of solid polyol polyester hardstock is required to provide passive oil loss control. For example, hardstock is preferably used in an amount of from about 20% to about 50% by weight of the liquid polyol polyester. (See Column 9, lines 65–68, of U.S. Pat. No. 4,005,195.) Such a level of solid polyol polyester hardstock used for passive oil loss control at body temperature can lead to a waxy tasting product due to the relatively high level of solids that will also be present at mouth temperature.

In view of the foregoing, it would be desirable to provide nondigestible fat compositions comprising blends of liquid polyol polyesters and solid polyol polyester hardstock particles with such blends exhibiting little or no phase separation of the hardstock particles from the liquid polyol polyesters. In addition, it would be desirable to be able to reduce the level or solid polyol polyester hardstock required for effective passive oil loss control so as to provide less waxy tasting products.

In addition to being useful as passive oil loss control agents when combined with liquid nondigestible oils, certain polyol polyesters which are solid at temperatures of about 25° C. and higher have also been used as thickening agents for conventional digestible triglyceride oils. For example, these solid polyol polyesters have been used as "thickening agents" for blending with liquid digestible or nondigestible oils in formulations such as shortening, as well as in other food products which contain a combination of fat and non-fat ingredients, e.g., margarines, mayonnaise, frozen dairy desserts and the like. (See, for example, Jandacek and Letton; U.S. Pat. No. 4,797,300; Issued Jan. 10, 1989.) However, these prior art thickening agents had to be used at levels of 10 to 25%. Accordingly, it would be desirable to reduce the level of thickening agents of this type in order to provide less waxy tasting products.

SUMMARY OF THE INVENTION

The present invention relates to nondigestible fat compositions which are useful as replacements for triglyceride fats and oils in food products. Such compositions have a Solid Fat Content (SFC) profile slope between room temperature (70° F.) and body temperature (98.6° F.) of from 0 to about −0.75%solids/°F. Such compositions further comprise a liquid nondigestible oil component having dispersed therein nondigestible solid polyol polyester particles in an amount sufficient to control passive oil loss upon the ingestion of the nondigestible fat compositions.

The liquid nondigestible oil component of the compositions herein is one which has a complete melting point below about 37° C. The polyol polyesters which can be used to form the nondigestible solid particles used as oil loss control agents in the compositions herein have a complete melting point above about 37° C. and comprise from 10% to 50% polyol polyester polymer and from 50% to 90% polyol polyester monomer. At least about 45% of the hydroxyl groups of the solid polyol polyester material are esterified with long chain ($C_{20}$ and higher) saturated fatty acid radicals. The polyol polyester polymer has an Iodine Value of less than about 20.

The nondigestible fat compositions of the present invention provide significant advantages over known intermediate melting polyol polyesters, as well as prior art blends of liquid polyol polyester and solid polyol polyester hardstocks. The relatively small nondigestible particles provide especially efficient passive oil loss control. As a result, the level of solids at body temperature required for passive oil loss control can be reduced to relatively low levels, (e.g., to less than 20%, preferably to less than 15% of the nondigestible fat). In addition, the nondigestible fats of the present invention have relatively flat SFC profile slopes, thus leading to minimal or no change in solids content between typical room and body temperature. This combination of relatively low solids levels required for passive oil loss control, with minimal/no solids content change between room and body temperatures, can result in less waxy tasting products containing these nondigestible fats.

The present invention also relates to digestible fat compositions which utilize particles of the hereinbefore described nondigestible polyol polyester material as thickening agents. Such compositions comprise from about 85% to about 98% of a digestible edible oil and from about 2% to about 15% of the nondigestible solid polyol polyester particles.

DETAILED DESCRIPTION OF THE INVENTION

A. Definitions

By "nondigestible" is meant that only about 70% or less of the material is digested by the body. Preferably, only about 20% or less of such materials are digested. More preferably, only about 1% or less of such materials are digested.

As used herein, the term "thickness" of a particle is used in its conventional sense of the smallest of the three dimensions (length, width, height) of any given particle.

As used herein, the term "spherulitic" refers to substantially spherical or round, essentially three-dimensional particles.

As used herein, the term "platelet-like" refers to a substantially flat, essentially two-dimensional type of particle having length and width in the unfolded planar configuration that is substantially greater in dimension than its thickness.

As used herein, the terms "filament-like" and "rod-like" refer to elongated, essentially one-dimensional particles.

As used herein, the term "complete melting point" refers to the temperature at which all solid components have melted. All melting points referred to herein are measured by Differential Scanning Calorimetry (DSC) as described hereinafter.

As used herein, the term "comprising" means various components, or steps, can be conjointly employed in the nondigestible fat compositions and processes of the present invention. Accordingly, the term "comprising" encompasses the more restrictive terms "consisting essentially of" and "consisting of".

By "polyol" is meant a polyhydric alcohol containing at least 4, preferably from 4 to 12, more preferably from 4 to 8, most preferably from 6 to 8, hydroxyl groups. Polyols thus include sugars (i.e., monosaccharides, disaccharides and trisaccharides), sugar alcohols (i.e., the reduction product of sugars wherein the aldehyde or ketone group has been reduced to an alcohol), other sugar derivatives (e.g., alkyl glycosides), polyglycerols such as diglycerol and triglycerol, pentaerythritol, and polyvinyl alcohols. Specific examples of suitable sugars, sugar alcohols and sugar derivatives include xylose, arabinose, ribose, xylitol, erythritol, glucose, methyl glucoside, mannose, galactose, fructose, sorbitol, maltose, lactose, sucrose, raffinose, and maltotriose. Preferred polyols include erythritol, xylitol, sorbitol, and glucose, with sucrose being an especially preferred polyol.

By "polyol polyester" is meant a polyol as hereinbefore described having at least 4 ester groups, i.e., at least 4 of the hydroxyl groups are esterified with fatty or other organic acids. Polyol esters that contain 3 or less ester groups are digested in (and the products of digestion are absorbed from) the intestinal tract much in the manner of ordinary triglyceride fats or oils, whereas those polyol esters which contain 4 or more ester groups are generally substantially nondigestible and consequently nonabsorbable by the human body. It is not necessary that all of the hydroxyl groups of the polyol be esterified, but it is preferable that disaccharide molecules contain no more than 3 unesterified hydroxyl groups, and more preferably no more than 2 unesterified hydroxyl groups, so that they are rendered nondigestible. Typically, substantially all (e.g., at least about 85%) of the hydroxyl groups of the polyol are esterified. For liquid polyol polyesters, preferably at least about 95% of the hydroxyl groups of the polyol are esterified. In the case of sucrose polyesters, typically from about 7 to 8 of the hydroxyl groups of the polyol are esterified.

By "ester group" is meant a moiety formed from the reaction of a hydroxyl group with an organic acid or acid derivative which moiety contains fatty acid and/or other organic radicals having at least 2 carbon atoms, typically at least 8 carbon atoms, more typically at least 12 carbon atoms, and most typically at least 16 carbon atoms. Representative examples of such fatty acid and other organic acid radicals include acetic, propionic, butyric, caprylic, capric, lauric, myristic, myristoleic, palmitic, palmitoleic, stearic, oleic, elaidic, ricinoleic, linoleic, linolenic, eleostearic, arachidic, arachidonic, behenic, lignoceric, erucic, and cerotic fatty acid radicals and other organic acid radicals including aromatic esters-forming radicals such as benzoic or toluic; branched chain radicals such as isobutyric, neooctanoic or methyl stearic; ultra-long chain saturated or unsaturated fatty acid radicals such as tricosanoic or triconsenoic; cyclic aliphatics such as cyclohexane carboxylic; and polymeric acid ester-forming radicals such as polyacrylic and dimer fatty acid. The fatty or other organic acid radicals can be derived from naturally occurring or synthetic fatty acids. The acid radicals can be saturated or unsaturated, including positional or geometric isomers, e.g. cis- or transisomers, straight chain or branched aromatic or aliphatic, and can be the same for all ester groups, or can be mixtures of different acid radicals.

All percentages, ratios and proportions used herein are by weight unless otherwise specified.

B. Liquid Nondigestible Oil

A key component of the nondigestible fat compositions herein is a liquid nondigestible oil having a complete melting point below about 37° C. Suitable liquid nondigestible edible oils for use herein include liquid polyol polyesters (see Jandacek; U.S. Pat. No. 4,005,195; Issued Jan. 25, 1977); liquid esters of tricarballylic acids (see Hamm; U.S. Pat. No. 4,508,746; Issued Apr. 2, 1985); liquid diesters of dicarboxylic acids such as derivatives of malonic and succinic acid (see Fulcher; U.S. Pat. No. 4,582,927; Issued Apr. 15, 1986); liquid triglycerides of alpha-branched chain carboxylic acids (see Whyte; U.S. Pat. No. 3,579,548; Issued May 18, 1971); liquid ethers and ether esters containing the neopentyl moiety (see Minich; U.S. Pat. No. 2,962,419; Issued Nov. 29, 1960); liquid fatty polyethers of polyglycerol (See Hunter et al; U.S. Pat. No. 3,932,532; Issued Jan. 13, 1976); liquid alkyl glycoside fatty acid polyesters (see Meyer et al; U.S. Pat. No. 4,840,815; Issued Jun. 20, 1989); liquid polymers of two ether linked hydroxypolycarboxylic acids (e.g., citric or isocitric acid) (see Huhn et al; U.S. Pat. No. 4,888,195; Issued Dec. 19, 1988); liquid esters of epoxide-extended polyols (see White et al; U.S. Pat. No. 4,861,613; Issued Aug. 29, 1989); as well as liquid polydimethyl siloxanes (e.g., Fluid Silicones available from Dow Corning). All of the foregoing patents relating to liquid nondigestible oils are incorporated herein by reference.

Preferred liquid nondigestible oils are the liquid polyol polyesters that comprise liquid sugar polyesters, liquid sugar alcohol polyesters, and mixtures thereof. The preferred sugars and sugar alcohols for preparing these liquid polyol polyesters include erythritol, xylitol, sorbitol, and glucose, with sucrose being especially preferred. The sugar or sugar alcohol starting materials for these liquid polyol polyesters are preferably esterified with fatty acids containing from 8 to 22 carbon atoms, and most preferably from 8 to 18 carbon atoms. Suitable naturally occurring sources of such fatty acids include corn oil fatty acids, cottonseed oil fatty acids, peanut oil fatty acids, soybean oil fatty acids, canola oil fatty acids (i.e. fatty acids derived from low erucic acid rapeseed oil), sunflower seed oil fatty acids, sesame seed oil fatty acids, safflower oil fatty acids, fractionated palm oil fatty acids, palm kernel oil fatty acids, coconut oil fatty acids, tallow fatty acids and lard fatty acids.

The nondigestible polyol polyesters that are liquid are those which have minimal or no solids at body temperatures (i.e., 98.6° F., 37° C.). These liquid polyol polyesters typically contain ester groups having a high proportion of $C_{12}$ or lower fatty acid radicals or else a high proportion of $C_{18}$ or higher unsaturated fatty acid radicals. In the case of those liquid polyol polyesters having high proportions of unsaturated $C_{18}$ or higher fatty acid radicals, at least about half of the fatty acids incorporated into the polyester molecule are typically unsaturated. Preferred unsaturated fatty acids in such liquid polyol polyesters are oleic acid, linoleic acid, and mixtures thereof.

The following are nonlimiting examples of specific liquid polyol polyesters suitable for use in the present invention: sucrose tetraoleate, sucrose pentaoleate, sucrose hexaoleate, sucrose heptaoleate, sucrose octaoleate, sucrose hepta- and octaesters of unsaturated soybean oil fatty acids, canola oil fatty acids, cottonseed oil fatty acids, corn oil fatty acids, peanut oil fatty acids, palm kernel oil fatty acids, or coconut oil fatty acids, glucose tetraoleate, the glucose tetraesters of coconut oil or unsaturated soybean oil fatty acids, the mannose tetraesters of mixed soybean oil fatty acids, the galactose tetraesters of oleic acid, the arabinose tetraesters of linoleic acid, xylose tetralinoleate, galactose pentaoleate, sorbitol tetraoleate, the sorbitol hexaesters of unsaturated soybean oil fatty acids, xylitol pentaoleate, and mixtures thereof.

The liquid polyol polyesters suitable for use herein can be prepared by a variety of methods known to those skilled in the art. These methods include: transesterification of the polyol (i.e. sugar or sugar alcohol) with methyl, ethyl or glycerol esters containing the desired acid radicals using a variety of catalysts; acylation of the polyol with an acid chloride; acylation of the polyol with an acid anhydride; and acylation of the polyol with the desired acid, per se. (See, for example, U.S. Pat. Nos. 2,831,854, 3,600,186, 3,963,699, 4,517,360 and 4,518,772, all of which are incorporated by reference. These patents all disclose suitable methods for preparing polyol polyesters.)

C. Solid Polyol Polyester Component

A second key component of the nondigestible fat compositions of this invention comprises relatively small nondigestible solid particles of certain polyol polyester material that are dispersed in the liquid nondigestible oil to control or prevent passive oil loss. These particles can be in a variety of forms and shapes, including spherulitic, platelet-like, filament-like, or rod-like, or combinations of these various shapes, but are typically spherulitic or platelet-like. The thickness of these particles is typically about 1 micron or less. Thinner particles, however, are preferred from a standpoint of providing more efficient passive oil loss control of the liquid nondigestible oil component of the compositions herein. Accordingly, these particles preferably have a thickness of 0.1 micron or less, more preferably 0.05 micron or less. These particles also have a complete melting point above about 37° C., preferably above about 50° C., more preferably above about 60° C.

The polyol polyester material which forms these nondigestible particles should have a complete melting point as measured by the Differential Scanning Calorimetry (DSC) described hereinafter in the Analytical Methods section which is sufficiently high such that the nondigestible particles themselves will have the hereinbefore specified melting point characteristics when such particles are dispersed in the liquid nondigestible oil. For example, a polyol polyester material having a complete melting point right at 37° C. may not form solid particles having a complete melting point above about 37° C. when such particles are dispersed in the liquid nondigestible oil. Thus, in some cases, the complete melting point of the neat polyol polyester material may have to be slightly higher than 37° C., e.g., about 40° C. or higher, in order to form solid particles having a complete melting point of 37° C. when such particles are combined with the liquid nondigestible oil.

These nondigestible particles can generally be dispersed as discrete, unaggregated entities in the liquid nondigestible oil. However, these nondigestible particles can also cluster together to form much larger aggregates which are dispersed in the liquid nondigestible oil. This is particularly true of those nondigestible particles that are platelet-like in form. Aggregates of platelet-like nondigestible particles typically assume a spherulitic shape that is porous in character and thus capable of entrapping significant amounts of liquid nondigestible oil. It is believed that this porous structure and its concomitant ability to entrap large amounts of liquid nondigestible oil is why these aggregated, platelet-like particles, while not as efficient as the particles in unaggregated form, can provide very effective and efficient passive oil loss control.

The polyol polyester material which forms the solid particles used in the fat compositions herein essentially comprises at least some material in the form of polymerized polyol polyesters, i.e., polyol polyester polymers. Polyol polyester polymers for purposes of this invention are those polyol polyester materials formed by polymerizing a polyol polyester monomer to provide a molecule having at least two separate esterified polyol moieties linked by covalent bonds between ester groups of these different polyol moieties. For example, two sucrose octabehenate monomers could be cross-linked between fatty acids to form a polymer. Repeating units of such polyol polyester polymers can be the same or different such that the genetic term "polymer" in this context includes the specific term "copolymer". The number of repeating monomer (or co-monomer) units which make up such polyol polyester polymers can range from about 2 to 20, preferably from about 2 to about 12. Depending on the method of preparing them, the polyol polyester polymers are frequently oligimers containing from about 2 to 4 monomeric units, i.e., are dimers, trimers, or tetramers. The most typical type of polyol polyester polymer for use herein is dimer.

Figure 1A:
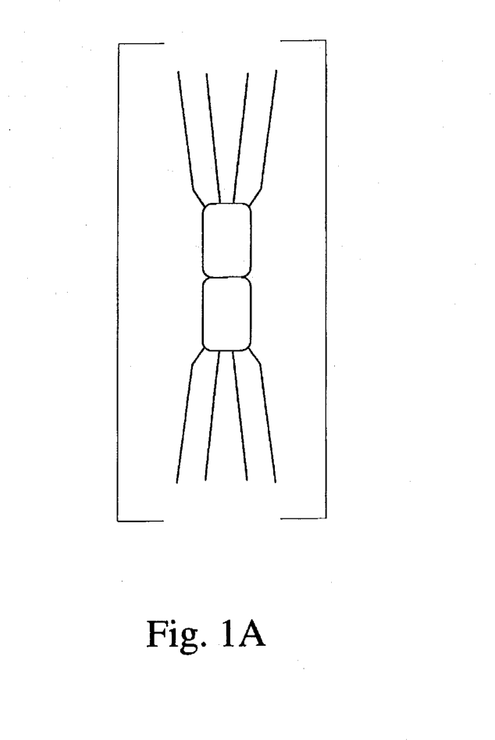
FIG. 1a through 1c represent is a depiction of sucrose octaester monomer, dimer and trimer, respectively.
Figure 1B:
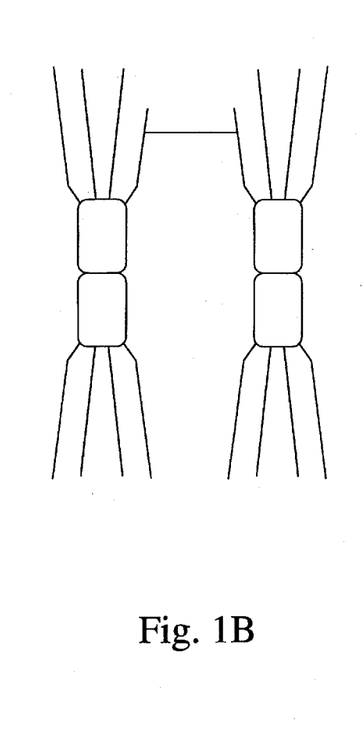
Figure 1C:
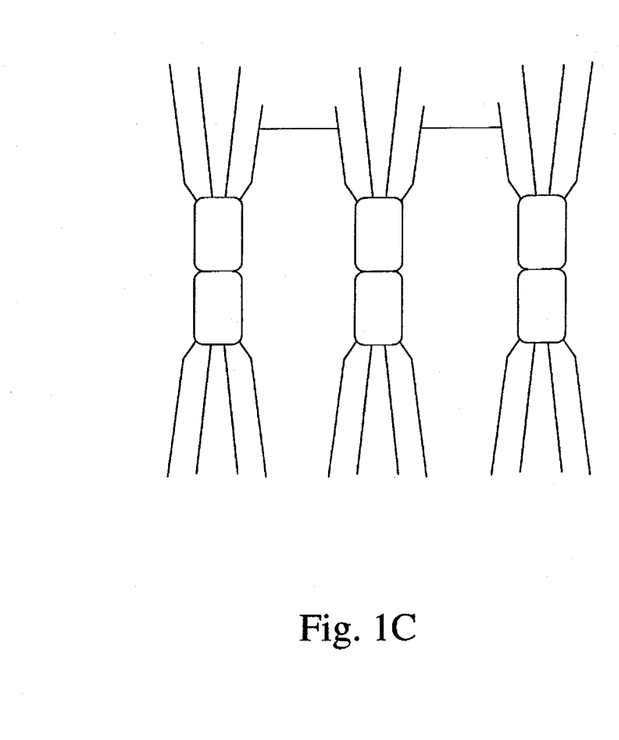

As with the liquid nondigestible oil component of the compositions herein, the most preferred polyol for forming the polyol polyester polymer component comprises sucrose. When sucrose is used, furthermore, it is preferably completely esterified with fatty acid or other ester group-forming acid radicals. Using sucrose as the polyol, completely esterified sucrose polyester monomer, dimer, and trimer are shown schematically in FIGS. 1a, 1b, and 1c, respectively. When sucrose is the polyol and the fatty acid ester-forming radicals are selected as hereinafter described in greater detail, the sucrose polyester polymers used in the nondigestible fat compositions herein can advantageously have a number average molecular weight of from about 4000 to 60,000, preferably from about 4000 to 36,000, more preferably from about 5000 to 12,000.

The nature of the ester-forming radicals which form the polyol polyester polymer materials is also important in determining the suitability of such polyol polyester polymer materials for use in the fat compositions herein. For purposes of this invention, at least about 45%, preferably at least about 75%, and most preferably at least about 90% of the hydroxyl groups of the polyol polyester polymer material should be esterified with long chain ($C_{20}$ or higher) saturated fatty acid radicals. Furthermore, the polyol polyester polymer materials used in the fat compositions herein generally have an Iodine Value of less than 20, preferably less than 10.

The polymer-containing polyol polyester material which forms the solid particles for use in the fat compositions herein may also comprise unpolymerized polyol polyester monomer material. Such monomers are those which contain only one polyol moiety per molecule, which polyol contains 4 to 8 hydroxyl groups, at least 4 of which are esterified. The ester-forming acid radicals on such polyol polyester monomers are, like the ester groups on the polymer materials, also preferably formed from long chain ($C_{20}$ or higher) saturated fatty acid radicals in the amounts hereinbefore specified for the polymer materials. Further, some of the ester groups of the polyol polyester monomer material may be formed by esterifying the single polyol moiety with polymerized (e.g., dimerized) fatty acid radicals.

Suitable long chain saturated fatty acid radicals for use in preparing the polyol polyester polymers and monomers used herein are those which contain at least 20, preferably from 20 to 26, most preferably 22, carbon atoms. The long chain saturated fatty acid radicals can be used singly, or in mixtures with each other, in all proportions. In addition, straight chain (i.e., normal) fatty acid radicals are typical for the long chain saturated fatty acid radicals. Examples of suitable long chain saturated fatty acid radicals are eicosanoate (arachidate), docosanoate (behenate), tetracosanoate (lignocerate), and hexacosanoate (cerotate).

Mixed fatty acid radicals from oils which contain substantial amounts of the desired long chain fatty acids can be used as sources of acid radicals in preparing the polyol polyester materials used to form the solid particles used in the present invention. The mixed fatty acids from such source oils should preferably contain at least about 30% (more preferably at least about 50%, most preferably at least about 80%) of the desired long chain saturated fatty acids. For example, hardened (i.e., hydrogenated) high erucic acid rapeseed oil fatty acids can be used in place of a mixture of the respective long chain saturated fatty acids having from 20 to 26 carbon atoms. Preferably, the $C_{20}$ or higher saturated fatty acids (or their derivatives, i.e., methyl esters) are concentrated, for example, by distillation.

Suitable polyol polyester material which forms the solid nondigestible particles used in the fat compositions herein will generally comprise from about 10% to about 50% of the polyol polyester polymer component and from 50% to about 90% of the unpolymerized polyol polyester monomer component. Preferably, this solid polyol polyester material comprises from about 10% to about 40% of the polyol polyester polymer component and from about 60% to about 90% of the monomer component. More preferably such material comprises from about 20% to 40% of the polymer component and from 60% to about 80% of the monomer component.

The solid polyol polyester material suitable for forming the solid particles used herein must contain at least some polyol polyester polymer. One way to prepare this material is by synthesizing monomeric polyol polyester according to known polyol esterification, transesterification and/or interesterification methods and by then polymerizing these monomers. The polymerization step can be initiated and promoted by any of a number of well known methods, including, but not limited to, photochemical reactions and reactions with transition metal ions, heat or free radical initiators such as di-tert-butyl peroxide.

Alternatively, polyol polyester polymers can be prepared directly by esterifying and/or interesterifying the polyol material with polybasic polymerized fatty acids or their derivatives. Since the sucrose polyesters are preferred materials for use in the present invention, the various types of suitable solid polyol polyester preparation methods will be exemplified by describing sucrose polyester synthesis. One such synthesis method involves reacting the acid chlorides or acid anhydrides of the desired esterifying acids with sucrose, preferably using a sequential esterification process to produce sucrose containing two different types of ester groups. In this sequential esterification process, sucrose is initially partially esterified with one type of fatty acid chloride, for example, dimer fatty acid chlorides, followed by complete or substantially complete esterification of this initial reaction product with another acid chloride type, e.g., with a long chain unpolymerized saturated fatty acid chloride, in that order, or in reverse order. (See Letton; European Patent 311,154; Published Apr. 12, 1989, incorporated herein by reference).

Another method for preparing the solid polyol polyester material is by the process of reacting the methyl esters of the desired acids with sucrose in the presence of a fatty acid soap and a basic catalyst such as potassium carbonate. (See, for example, Rizzi et al; U.S. Pat. No. 3,963,699; Issued Jun. 15, 1976, Volpenhein; U.S. Pat. No. 4,518,772; Issued May 21, 1985, and Volpenhein; U.S. Pat. No. 4,517,360; Issued May 14, 1985, all of which are incorporated by reference.) When using this methyl ester route to prepare, for example, diversely esterified sucrose polyesters, the octaester of one of the types of acids (e.g., dimer fatty acids, or long chain saturated fatty acids) can be prepared first, followed by partially interesterifying this initial reaction product with the methyl ester of the other type of acid. In another preferred way of preparing solid polyol polyester material using methyl ester derivatives, the methyl esters of long chain saturated fatty acids are reacted with sucrose in a first stage at about 135° C. to obtain partial esters of sucrose. The methyl esters of dimer fatty acids or other polybasic fatty acids are then added to the reaction and the temperature is dropped to 90°–120° C., as necessary, (and reflux, if required, as with adipic acid methyl esters, for example) to obtain the desired degree of esterification, is maintained by adjusting pressure and/or temperature.

When using the acid chloride or methyl ester procedures herein described to esterify the polyol with already polymerized fatty acids, a wide variety of pre-polymerized fatty acid materials can be used. One such class of suitable polymerized fatty acids comprises long-chain, aliphatic, dibasic acids having from about 28 to about 44 carbon atoms in the molecule. They are generally formed from unsaturated fatty acids having from about 14 to about 22 carbon atoms which can be polymerized. For example, linoleic acid can be polymerized by heating to form linoleic acid dimer as follows:

$$2\ CH_3(CH_2)_5CH=CH-CH=(CH_2)_7COOH \xrightarrow{heat}$$

Common examples of such polymerizable acids are those containing two or more double bonds (polyunsaturated acids) such as the octadecadienoic acids containing two double bonds, for example, the above-mentioned linoleic acid, and the octadecatrienoic acids containing 3 double bonds, for example, linolenic and eleostearic acids. Other common polymerizable polyunsaturated acids having from about 14 to about 22 carbon which can be used to prepare the polyol polyester polymers herein are other octadecatrienoic acids (e.g., licanic acid), actadectetraenoic acid (e.g., parinaric acid), eicosadienoic acid, eicostetraenoic acid (e.g., arachidonic acid), 5,13-docosadienoic acid and clupanodonic acid. Monounsaturated fatty acids, such as oleic. elaidic and erucic acids, can also be used in preparing suitable long chain fatty acid dimers used to form the solid particles used in the present invention.

Mixed fatty acid radicals from source oils which contain substantial amounts of the desired polyunsaturated or monounsaturated fatty acids can be used as sources of acid radicals in preparing the polyol polyester materials used to form the solid particles used in the present invention. The mixed fatty acids from such source oils should preferably contain at least about 30% (more preferably at least about 50%, most preferably at least about 80%) of the desired polyunsaturated or monounsaturated fatty acids.

Illustrative of natural sources which are rich in linoleic acid are soybean oil, cottonseed oil, peanut oil, corn oil, sesame seed oil, sunflower seed oil, safflower oil, linseed oil and perilla oil. Oiticica oil is a particularly good source of licanic acid and tung oil contains a high concentration of eleostearic acid. Fish oils, such as herring manhaden, pilchard, salmon and sardine oil are also suitable sources of polymerizable acids, particularly the higher fatty acids such as arachidonic and clupanodonic acids. Other oils such as tall oil, dehydrated castor oil, olive oil and rapeseed oil also contain significant proportions of suitable unsaturated acids. For example, olive oil is rich in oleic acid and rapeseed oil is rich in erucic acid.

Preferred polybasic polymerized fatty acids and fatty acid derivatives include dibasic acids produced by dimerization of the fatty acids or fatty acid lower esters derived from polyunsaturated vegetable oils such as soybean oil or cottonseed oil or from animal fats such as tallow.

These polybasic polymerized fatty acids may be made by a variety of methods known to those skilled in the art. (See Lutton; U.S. Pat. No. 3,353,967; Issued Nov. 21, 1967, Goebel; U.S. Pat. No. 2,482,761; Issued Sep. 27, 1949, Harrison et al; U.S. Pat. No. 2,731,481; Issued Jan. 17, 1956 and Barrett et al; U.S. Pat. No. 2,793,219; Issued May 21, 1957, all of which are incorporated herein by reference.)

As noted, a mixture of both polymerized and unpolymerized polyol polyester material can be prepared by reacting the polyol with both polymerized and unpolymerized esterifying fatty acids or fatty acid derivatives. In a preferred method for preparing particularly desirable solid sucrose polyester material comprising sucrose polyester polymers, fractionated or unfractionated high erucic acid rapeseed (HEAR) methyl esters are partially polymerized, hardened and then reacted with sucrose. Another method of making these especially desirable solid sucrose polyesters is to make liquid sucrose polyester material esterified with fatty acid groups of high erucic acid rapeseed oil by a conventional process, to then partially polymerize the resulting liquid sucrose polyester material, and to then harden the resulting polymerized material.

D. Preparation of Nondigestible Fat Compositions Which Exhibit Minimal Passive Oil Loss To prepare the nondigestible fat compositions herein which exhibit passive oil loss control, the liquid nondigestible oil is combined with the particles of the at least partially polymerized solid polyol polyester material hereinbefore described. The polyol polyester particles are used in an amount sufficient to control or prevent passive oil loss. What constitutes "an amount sufficient to control or prevent passive oil loss" for any given fat composition depends on the particular solid polyol polyester utilized therein, the particular passive oil loss control benefits desired, and the level of waxiness mouth impression which can be tolerated for the particular nondigestible fat composition which is formulated. Typically, the fat composition so formed will comprise from about 60% to about 99% of the liquid nondigestible oil and from about 1% to about 40% of the solid polyol polyester particles. Preferably, this mixture comprises from about 85% to about 99% liquid nondigestible oil and from about 1% to about 15% solid polyol polyester particles, more preferably from about 90% to about 99% liquid nondigestible oil and from about 1% to about 10% solid polyol polyester particles, and most preferably from about 95% to about 99% liquid nondigestible oil and from about 1% to about 5% solid polyol polyester particles. The use of higher levels of liquid nondigestible oil (i.e., lower levels of solid polyol polyester particles) may be desirable from the standpoint of reducing the waxiness impression left by the solid components of the nondigestible fat composition herein. However, higher levels of solid polyol polyester particles (i.e., lower levels of liquid nondigestible oil) are desirable from the standpoint of controlling or preventing passive oil loss associated with the ingestion of compositions containing such liquid nondigestible oils.

The combination of liquid nondigestible oil and solid polyol polyester particles is typically formed by simply mixing the liquid and solid components together, by heating the mixture until the solid polyol polyester material melts or dissolves in the oil and then by cooling the mixture to a suitable crystallization temperature, e.g., room temperature, which causes polyol polyester particles to form.

The specific size of the polyol polyester particles formed in the fat compositions herein will be dependent upon the rate at which the heated combination of oil and dissolved solid is coolest. As used herein, cooling rate is defined as the temperature differential between (a) the heated oil/dissolved solid combination and (b) the cooled crystallized liquid/solid particle combination, divided by the time taken to create this temperature differential. Generally the greater the cooling rate employed in forming the fat compositions herein, the smaller will be the particles of solid polyol polyester material dispersed in such compositions. Desirable cooling rates for use in forming the fat compositions herein are typically greater than 1.8° C./min. (1° F./min.), preferably greater than 9° C./min. (5° F./min.), more preferably greater than 18° C./min. (10° F./min.), and most preferably greater than 90° C./min. (50° F./min.). When the nondigestible fat compositions herein are to be formed in situ, for example, within a food product of which they form a part, then the type and concentration of the fat composition components should be selected so that the cooling profile experienced by the food product will result in formulation of the desired amount and size of the solid polyol polyester particles within the food product.

The formation of thin nondigestible particles according to the present invention provides especially efficient passive oil loss control for the resulting fat composition. Such efficiency permits a reduction in solids content of the nondigestible fat to relatively low levels (e.g., to from about 1% to about 15%). This reduction in solids levels required for passive oil loss control, together with the minimal/no change in solids between typical room and body temperatures, leads to nondigestible fats having a less waxy tasting impression.

Both the liquid nondigestible oil and the solid nondigestible polyol polyester components, as well as the respective concentrations, are selected in order to provide nondigestible fat compositions having a certain set of physical characteristics. In particular, the nondigestible fats of the present invention should exhibit a relatively flat Solid Fat Content (SFC) profile slope across the temperature range of from room temperature to body temperature, i.e., from 70° F. to 98.6° F. The SFC profile slope between these two temperatures should be from 0 to about −0.75%solids/°F., preferably from 0 to −0.5 %solids/°F., more preferably from 0 to about −0.3%solids/°F., and most preferably from 0 to about −0.1%solids/°F. The method for determining SFC profile slope of the fat compositions herein is described hereinafter in the Analytical Methods section.

E. Food Products With Nondigestible Fat Compositions

The nondigestible fat compositions of the present invention can be used in various edible fat-containing products including foods, beverages, and pharmaceuticals, either alone or in combination with digestible fats and oils. In particular, the nondigestible fats of the present invention can be optionally formulated with a digestible triglyceride fat or oil. Generally, these formulations can comprise from about 10% to 100% nondigestible fat and from 0% to about 90% digestible triglyceride fat or oil. Preferably, these formulations comprise from 35% to 100%, more preferably from about 50% to about 100% and most preferably from about 75% to about 100% nondigestible fat, and from 0% to about 65%, more preferably from 0% to about 50%, and most preferably from 0% to about 25%, digestible triglyceride fat or oil. Because of the potential calorie impact of these triglyceride fats or oils, it is desirable to minimize the level at which they are combined with the nondigestible fat compositions of the present invention.

As used herein, the term "triglyceride oil" refers to those triglyceride compositions which are fluid or liquid above about 25° C. Although not a requirement, the triglyceride oils useful in the present invention can include those which are fluid or liquid below 25° C. These triglyceride oils consist primarily of triglyceride materials, but can also include residual levels of other components such as mono- and diglycerides. To remain fluid or liquid at temperatures below 25° C., the triglyceride oil contains a minimal amount of glycerides having melting points higher than about 25° C. so as to limit the solids increase when the triglyceride oil is cooled. It is desirable that the triglyceride oil be chemically stable and resistant to oxidation.

Suitable triglyceride oils can be derived from naturally occurring liquid vegetable oils such as cottonseed oil, soybean oil, safflower oil, corn oil, olive oil, coconut oil, palm kernel oil, peanut oil, rapeseed oil, canola oil (i.e., rapeseed oil low in erucic acid), sesame seed oil, sunflower seed oil, and mixtures thereof. Also suitable are liquid oil fractions obtained from palm oil, lard and tallow by, for example, graining or directed interesterification, followed by separation of the oils. Oils predominating in glycerides of unsaturated acids can need some hydrogenation to maintain flavor, but care should be taken not to greatly increase the amount of glycerides melting above 25° C. When oils are selected which have a larger amount of solids melting between 25° and 40° C. than are desirable, it can be necessary to separate out the solids. For example, refined and slightly hydrogenated soybean oil is suitable, as well as refined cottonseed oil.

As used herein, the term "triglyceride fat" refers to those triglyceride compositions which are solid or plastic above about 25° C. These solid or plastic fats can be derived from plants or animals or can be edible synthetic fats or oils. For example, animal fats such as lard, tallow, oleo oil, oleo stock, oleo stearin and the like which are solid at room temperature can be utilized. Also, triglyceride oils, e.g. unsaturated vegetable oils, can be converted into plastic fats by partial hydrogenation of the unsaturated double bonds of fatty acid constituents of the oil followed by conventional chilling and crystallization techniques or by proper mixture with sufficient triglycerides which are solid at room temperature to form a rigid interlocking crystalline structure which interferes with the free-flowing properties of the liquid oil. See Purves et al; U.S. Pat. No. 3,355,302; Issued Nov. 28, 1967, and Darragh et al; U.S. Pat. No. 3,867,556; Issued Feb. 18, 1975 (both incorporated herein by reference), for further examples of solid or plastic fats. Because the solid or plastic fats add an appreciable level of solids, their inclusion can cause adverse effects on the organoleptic properties, in particular waxiness, of the edible compositions of the present invention.

Triglyceride fats and oils useful in the nondigestible fat compositions of the present invention can include certain triglycerides in which one, two or three of the OH groups of the glycerol molecule have been substituted with acetyl, propionyl, butyryl, caproyl, caproyl, or capryl radicals, and the remaining OH groups of the glycerol molecule (if any) have been substituted with acyl radicals of saturated or unsaturated fatty acids having from 12 to 24 carbon atoms.

The nondigestible fat materials of this invention can also be used in combination with reduced calorie medium chain and mixed medium/long chain triglycerides such as are disclosed in Ehrman et al; U.S. Pat. No. 4,888,196; Issued Dec. 19, 1989 and Seiden; European Patent 322,027; Published Jun. 28, 1989, both incorporated herein by reference.

The nondigestible fat compositions according to the present invention can be used in or as shortening and oil products. The shortening and oil products can be used in frying applications such as the preparation of french fried potatoes, potato chips from potato slices or fabricated potato pieces, potato sticks, corn chips, tortilla chips, donuts, chicken, fish, and fried pies (e.g. turnovers). The shortening and oil products can also be used in preparing baked goods in any form, such as mixes, shelf-stable baked goods, and frozen baked goods, including, but not limited to, cakes, granola bars, brownies, muffins, bar cookies, wafers, biscuits, pastries, pies, pie crusts, and cookies, including sandwich cookies, chocolate chip cookies, particularly storage stable dual-texture cookies as disclosed in Hong et al.; U.S. Pat. No. 4,455,333; Issued Jun. 19, 1984. These baked goods can contain fruit, cream, or other fillings. Other baked goods uses include breads and rolls, crackers, pretzels, pancakes, waffles, ice cream cones and cups, yeast-raised bake goods, pizza and pizza crust, and baked farinaceous snack products and other baked salted snacks.

Other edible fat-containing products which contain the nondigestible fat compositions of this invention include ice cream, frozen desserts, cheese, cheese spreads, meats, meat analogs, chocolate confections, salad dressings, mayonnaise, margarine, spreads, sour cream, yogurt, coffee creamer, peanut butter, extruded snacks such as corn curls, corn puffs, pellet snacks, half products and other extruded snacks based on corn or other cereal grains such as wheat, rice and the like, roasted nuts and beverages such as milkshakes.

Edible fat-containing products which contain the fat compositions of the present invention can also include noncaloric or reduced calorie sweeteners alone or in combination with bulking agents. These noncaloric or reduced calorie sweeteners include, but are not limited to, aspartame, saccharin, alitame, thaumatin, dihydrochalcones, acesulfame, and cyclamates.

Bulking or bodying agents which can also be useful in edible fat-containing products containing the nondigestible fat compositions herein include partially or wholly nondigestible carbohydrates, for example, polydextrose and cellulose or cellulose derivatives, such as D, L-sugars, carboxymethylcellulose, carboxymethylcellulose, hydroxypropylcellulose, methylcellulose, hydroxypropyl methylcellulose, and microcrystalline cellulose. Other suitable bulking agents include gums (hydrocolloids), starches, dextrins, fermented whey, tofu, maltodextrins, polyols, including sugar alcohols, e.g., sorbitol and mannitol, and carbohydrates, e.g., lactose.

The edible fat-containing products containing the nondigestible fat compositions herein can also include dietary fibers. By "dietary fiber" is meant complex carbohydrates resistant to digestion by mammalian enzymes, such as the carbohydrates found in plant cell walls and seaweed, and those produced by microbial fermentation. Examples of these complex carbohydrates are brans, celluloses, hemicelluloses, pectins, gums and mucilages, seaweed extract and biosynthetic gums. Sources of the cellulosic fiber include vegetables, fruits, seeds, cereals, and man-made fibers (for example, by bacterial synthesis). Commercial fibers such as purified plant cellulose, or cellulose flour, can also be used. Naturally occurring fibers can be used, such as psyllium and fibers from whole citrus peel, citrus albedo, sugar beets, citrus pulp and vesicle solids, apples, apricots, and watermelon rinds.

These dietary fibers can be in a crude or purified form. The dietary fiber used can be of a single type (e.g., cellulose), a composite dietary fiber (e.g., citrus albedo fiber containing cellulose and pectin), or some combination of fibers (e.g., cellulose and a gum). The fibers can be processed by methods known to the art.

The nondigestible fat compositions of the present invention can be fortified with vitamins and minerals, particularly the fat-soluble vitamins. The fat-soluble vitamins include vitamin A, vitamin D, and vitamin E and their precursors. (See Mattson; U.S. Pat. No. 4,034,083; Issued Jul. 5, 1977, herein incorporated by reference, which discloses fat-soluble vitamins useful in fortifying polyol fatty acid polyesters.)

Various other ingredients typically present in fat products can also be included in the nondigestible fat compositions of the present invention. These other ingredients include stabilizers to help protect against oxidative deterioration at high temperatures. Silicone oils, particularly methyl and ethyl silicone oils, are useful for this purpose. Methyl silicones have also proven effective in reducing the rate of polymerization during frying. Other additives typically included in fat products such as minor amounts of optional flavorings, emulsifiers, anti-spattering agents, anti-sticking agents, antioxidants or the like can also be present.

F. Alternative Utility for the Polymer-Containing Solid Polyol Polyester Particles It has been found that the solid polymer-containing polyol polyester particles useful as oil loss control agents in the nondigestible fat composition herein are also effective for use as thickening agents in conventional digestible triglyceride oils and oil containing products. Accordingly, these solid polyol polyesters particles can be used as "thickening agents" or "hardstocks" by blending them in amounts of about 2% to about 20% (preferably from about 2% to about 15%, most preferably from about 2% to about 8%) with liquid digestible oils in the formulation of cooking and salad oils or semi-solid food products such as shortenings, as well as other food products which contain a combination of fat and non-fat ingredients, e.g., margarines, mayonnaise, frozen dairy desserts and the like. The oils for these compositions can comprise conventional digestible triglyceride oils such as cottonseed, corn, canola or soybean, or medium or medium and long chain triglycerides.

G. Analytical Methods

A number of parameters used to characterize elements of the present invention are to be quantified by particular experimental analytical procedures. Each of the procedures is described in detail as follows:

1. Fatty Acid Composition of Polyol Polyesters

The fatty acid composition (FAC) of the polyol polyesters can be determined by gas chromatography, using a Hewlett-Packard Model S712A gas chromatograph equipped with a flame ionization detector and a Hewlett-Packard Mode 17571A automatic sampler. The chromatographic method used is described in *Official Methods and Recommended Practices of the American Oil Chemists Society*, 4th Ed., 1989, Procedure 1-Ce62 (incorporated herein by reference).

2. Ester Distribution of Sucrose Polyesters

The relative distribution of the individual octa-, hepta-, hexa- and penta- esters, as well as collectively the tetra- through mono- esters, of the sucrose polyesters can be determined using normal-phase high performance liquid chromatography (HPLC). A silica gel-packed column is used in this method to separate the polyester sample into the respective ester groupings noted above. Hexane and methyl-t-butyl ether are used as the mobile phase solvents. The ester groupings are quantitated using a mass detector (i.e. an evaporative light-scattering detector). The detector response is measured and then normalized to 100%. The individual ester groups are expressed as a relative percentage.

3. Slope of Solid Fat Content (SFC) Profile of Nondigestible Fat Measured in °F.

Before determining the SFC values, a sample of the nondigestible fat is heated to a temperature of 140° F. (60° C.) or higher for at least 30 minutes or until the sample is completely melted. The melted sample is then tempered as follows: at 80° F. (26.7° C.) for 15 minutes; at 32° F. (0° C.) for 15 minutes; at 80° F. (26.7° C.) for 30 minutes; at 32° F. (0° C.) for 15 minutes. After tempering, the SFC values of the sample at temperatures of 50° F. (10° C.), 70° F. (21.1° C.), 80° F. (26.7° C.), 92° F. (33.3° C.), and 98.6° F. (37° C.) are determined by pulsed nuclear magnetic resonance (PNMR) after equilibration for 30 minutes at each temperature. The slope of the SFC profile is calculated by subtracting the SFC value at 70° F. (21.1° C.) from the SFC value at 98.6° F. (37° C.) and then dividing by 28.6. The method for determining SFC values by PNMR is described in *J. Amer. Oil Chem. Soc.*, Vol. 55 (1978), pp. 328–31 (herein incorporated by reference, and A.O.C.S. Official Method Cd. 16–81, *Official Methods and Recommended Practices of The American Oil Chemists Society*, 4th. Ed., 1989, (herein incorporated by reference).

4. Complete Melting Point of Polyol Polyesters by Differential Scanning Calorimetry (DSC)

The complete melting point of the polyol polyester material or polyol polyester-containing particles used in this invention can be determined by DSC as follows:

Equipment:
Perkin-Elmer 7 Series Thermal Analysis System, Model DSC7, manufactured by Perkin-Elmer, Norwalk, Conn.
Procedure:
1. Sample of polyol polyester material or polyol polyester-containing blend is heated to at least 10° C. above the temperature at which all visible solids are melted and mixed thoroughly.
2. 10±2 mg of sample is weighed into sample pan.
3. A scan is performed from about 10° C. above the temperature at which all visible solids are melted to −60° C. at 5° C. per minute.
4. The temperature of the sample is maintained at −60° C. for 3 minutes and scanned from −60° C. to the original starting temperature at 5° C. per minute (i.e., from about 10° C. above the temperature at which all visible solids are melted).

5. The complete melt point is the temperature at the intersection of the base line (i.e. specific heat line) with the line tangent to the trailing edge of the last (e.g., highest temperature) endothermic peak.

5. Thickness of Solid Polyol Polyester Particles (Light Microscopy)

The thickness of the solid polyol polyester particles formed in the nondigestible fat compositions herein may be estimated at room temperature with a Nikon Microphot video-enhanced light microscope (VELM) using Hoffman Modulation Contrast (HMC) optics according to the following method:
1. A small portion (i.e., 1–10 mg) of the nondigestible fat sample with the solid polyol polyester particles dispersed therein is placed on a microscope slide and covered. The slide is placed under the microscope.
2. The sample is examined using a HMC 100× oil objective as the standard lens in conjunction with a 10× eyepiece lens.
3. A microscope-mounted video camera and associated controller are used for video enhancement to facilitate differentiation between the sample and the background.
4. The thickness of the solid polyol polyester particles is measured in um.

This method permits differentiation of particles having thicknesses just within the resolution of the VELM (approximately 0.2–0.5 um). Particle thickness of particles having smaller dimensions can be determined by the Freeze Fracture Method described hereinafter.

(Note: No special sample preparation is required, other than obtaining a representative sample. The samples should be melted and cooled ambiently.)

Reference: Robert Hoffman, "The Modulation Contrast Microscope: Principles and Performances", *Journal of Microscopy*, Vol. 110, Pt 3, August 1977, pp. 205–222.

6. Thickness of Solid Polyol Polyester Particles (Freeze Fracture Transmission Electron Microscopy)

The three-dimensional topography of polyol polyester particles and their size can be determined by a freeze-fracture transmission electron microscopy method.

This freeze-fracture method is carried out as follows:
1. The outside cavity of a freezing container is filled with liquid $N_2$ and the inner dewar of the freezing container is filled with liquid ethane (normal melting temperature of −172° C.). The ethane is allowed to freeze.
2. A small amount (1–2 ul) of the nondigestible fat sample with the solid polyol polyester particles dispersed therein is placed in the well of a gold-plated Balzers specimen holder. (Note: for very fluid samples, 1–2 ul of sample is placed on a gold planchet (Balzers) and another planchet is placed on top of the first to form a sandwich.)
3. Most of the frozen ethane in the dewar is melted by inserting a metal heat sink (e.g., tweezers) into the dewar.
4. Immediately after melting the ethane, the specimen holder containing the nondigestible fat sample is picked up using a pair of tweezers and rapidly plunged into the liquid ethane.
5. After a few seconds, the specimen holder is removed from the ethane, quickly touched to the tip of a camel's hair brush to remove excess ethane, and immediately immersed in the liquid $N_2$ to keep the sample cold.
6. The sample is transferred under liquid $N_2$ to a JEOL JFD-9000C sample holder and then transferred into the chamber of a JEOL JFD-9000C freeze-fracture unit. The temperature of the unit should be about −175° C. Vacuum should be at least $8 \times 10^{-7}$ tort.
7. A knife is cooled to a temperature of about −165° C.
8. The sample is fractured in the JEOL chamber using the pre-cooled knife.
9. Platinum-carbon is deposited onto the fractured sample at a 45o angle for 4.5 seconds, followed by carbon deposition at a 90o angle for 25 seconds to form a replica of the fractured sample. The high voltage is 2500 V and the current is 70 mA.
10. The samples are removed from the freeze fracture unit and cleaned using 3 washes of chloroform.
11. The replica is picked up on a 300 mesh copper EM grid and examined in a transmission electron microscope.
12. Images are recorded on negative film and positive prints are made from the negatives.
13. The thickness of the polyol polyester particles is measured in nm.

References:
Rash, J. E. and Hudson, C. S., *Freeze Fracture: Methods, Artifacts, and Interpretations*, New Haven Press, New York, 1979.

Stolinski and Breathnach, *Freeze Fracture Replication of Biological Tissues*, Academic Press, London, 1975.

Steinbrecht and Zierold, *Cryotechniques in Biological Electron Microscopy*, Springer-Verlag, Berlin, 1987.

7. Saponification Value of Solid Polyol Polyester

The solid polyol polyester sample can be saponified with refluxing alcoholic KOH according to the procedure described in *Official Methods and Recommended Practices of the American Oil Chemists Society*, 4th Ed., 1989, Procedure Cd 3–25. The resulting fatty acid soaps are titrated with standardized HCl to a phenolphthalein endpoint. A blank (no sample added) is also run through the procedure and titrated.

The Saponification Value can then be calculated according to the following equation:

$$SV = ((B-S) \times N \times 56.1)/W$$

Where

B: vol. (mls) HCl required to titrate blank
S=vol. (mls) HCl required to titrate sample
N=normality of the HCl
W=sample weight in grams

8. Acid Value of Solid Polyol Polyester

The solid polyol polyester sample can be titrated with standardized KOH to a phenolphthalein endpoint. The procedure is described in *Official Methods and Recommended practices of the American Oil Chemists Society*, 4th Ed., 1989, Procedure Cd 3a–63. A blank (no sample added) is titrated also.

The Acid Value can then be calculated according to the following equation:

$$AV = ((A-B) \times N \times 56.1)/W$$

where

A=volume in mls of KOH required to titrate sample
B=volume in mls of KOH required to titrate blank N=normality of the KOH
W=sample weight in grams

9. Hydroxyl Value of Solid Polyol Polyester

The free hydroxyl groups of the sample can be quantitatively acetylated with acetic anhydride in pyridine. After acetylation, residual acetic anhydride is hydrolyzed with excess water and the acetic acid remaining is tinted with standardized ethanolic KOH to a phenolphthalein endpoint. A blank (no sample added) is run through the procedure and titrated also. The procedure is described in *Official Methods and Recommended Practices of the American Oil Chemists Society*, 4th Ed., 1989, Procedure Cd 13–60.

The Hydroxyl Value can then be calculated according to the following equation:

$$HV=(((B-S) \times N \times 56.1)/W)+AV$$

where
B=volume in mls of KOH required to titrate the blank
S=volume in rids of KOH required to titrate the sample
N=normality of the KOH
AV=acid value of the sample (described hereinabove)

10. Polymer Content Of Solid Polyol Polyester Material

The relative amounts of monomer and total polymer material (e.g., sucrose polyester dimer, trimer, tetramer, etc.) in the solid polyol polyester particle material can be determined using size exclusion chromatography. This method uses a Hewlett-Packard HP-1090 liquid chromatography system (LC) in combination with a Polymer Laboratories 60 cm×7.5 mm, 500 A porosity 5 um column. The LC is set up to run under the following conditions:

| | |
|---|---|
| Injection Volume | 20 uL/min. |
| Flow Rate | 1.0 uL/min. |
| Mobile Phase | Filtered & Degassed tetrahydrofuran (THF) |
| Detector Attenuation | 32 X |
| Detector Temperature | 40° C. |
| Chart Speed | 5.0 mm/min. |

A solid polyol polyester sample (0.75 grams) is dissolved in 25 cc of THF, and then 20 microliters of this solution is injected into the LC system. The column separates the sample into monomer and polymer. The fractions are analyzed by a refractive index detector (Erma Optical Works ERC-75 12). The detector response is then measured by an integrator. Relative peak areas eluting earlier than polyol polyester monomer are manually summed to report % polymer.

The various fractions (e.g., monomer, dimer, trimer and tetramer and higher) are resolved into individual peaks on a strip chart. The monomer peak is identified by comparison with a previously run monomer standard. The elution order (increasing time) is tetramer and higher, trimer, dimer, and monomer. The instrument calculates the area under each peak. The weight percent of an individual polymeric species is the area under the species peak, divided by the sum of the areas under all the peaks.

H. Specific Examples

Preparation of the nondigestible fat compositions of the present invention is illustrated by the following examples:

EXAMPLE I

Solid Sucrose Polyester Preparation

Solid sucrose polyester material for use in a nondigestible fat composition is prepared by reacting sucrose with the methyl esters of both behenic acid and dimerized distilled tallow fatty acids.

Behenic Methyl Ester Preparation

Behenic methyl esters are prepared from hydrogenated high erucic rapeseed oil. About 870 grams of hydrogenated high erucic rapeseed oil, about 174 grams of methanol, and about 12.2 grams of sodium methoxide solution (25% in methanol) are added to a spherical 3-liter glass reactor. The reactor has a heating mantle, thermometer, temperature controller, reflux condenser, variable speed agitator, vacuum take-off, and bottom outlet. The mixture is reacted at about 65° C. for approximately 1.5 hours, while refluxing the methanol. The agitation is stopped, and the glycerin by-product of the rapeseed oil is allowed to settle for about 30 minutes. The glycerin settles to the bottom of the reactor, and is removed through the bottom outlet. About 30 additional grams of methanol, and about 5.2 grams of sodium methoxide solution (25% in methanol) are added to the glass reactor, and the mixture is reacted at about 65° C. for about 30 minutes. The agitation is stopped, the glycerin is settled for about 30 minutes, and removed through the bottom outlet. About 100 grams of water are added to the mixture, stirred, allowed to settle, and removed through the bottom outlet. The water-washing procedure is repeated two more times. The reflux condenser is removed, and vacuum is applied to the reactor, and the residual water and methanol are evaporated. The vacuum is broken, and a glass fractionation column is added to the reactor. The reactor is heated to about 170°–200° C. under a vacuum of about 0.3–1.0 mm Hg. Approximately 50% of the first material to evaporate from the column is collected and discarded. The next 40% (approximately) of material to evaporate from the column is collected a product. This product is approximately 92% by weight methyl behenate and has the composition set forth hereinafter in Table I.

Dimer Methyl Ester Preparation

About 100 grams of dimer fatty acids prepared from fractionated, distilled tallow fatty acids (Henkel 1008 dimer fatty acid) are added to a 1-liter glass reactor along with about 300 ml of Supelco BF3 (boron trifluoride)/methanol solution. The reactor is agitated with a paddle stirrer, has a heating mantle with temperature controller, a thermometer, an addition funnel, and a water-cooled reflux condenser. The temperature of the reactor is raised to about 65°–70° C., and kept there for about 2 hours. At the end of about 2 hours, an additional 100 ml of BF3/methanol is added to the mixture, dropwise, through the addition funnel over the course of about an hour. The mixture is transferred to a large separation funnel and the phases are allowed to separate. The methanol layer is removed, then about 50 grams of hexane is added to the: mixture in the separation funnel and mixed thoroughly. This mixture is washed with about 50 grams of distilled water, the water layer is allowed to separate, and then removed. The water-washing procedure is repeated two more times. The mixture in the separatory funnel is transferred to a rotary evaporator, and the hexane is evaporated from the methyl esters. A base titration of the dried methyl esters is performed to ensure that the free fatty acid level is less than about 5%. The methyl esters are then run through a silica column to remove the remaining free fatty acid. The fractionated distilled tallow fatty acids from which the dimer fatty acids and, subsequently, the dimer methyl esters, are prepared typically have the compositions set forth hereinafter in Table I.

Sucrose Esterification

About 72.8 grams of the dimer methyl esters are mixed with about 306.3 grams of the behenic methyl esters. The molar ratio of dimer fatty acids:$C_{22}$ is about 1:7. About 189.5 grams of this methyl ester mixture are added to a 1-liter spherical glass reactor along with about 34.4 grams of powdered sucrose, about 24 grams of powdered potassium stearate and about 1.4 grams of powdered potassium carbonate. The reactor has a heating mantle, thermometer, temperature controller, variable speed agitator, vacuum take-off, and bottom outlet. The mixture is agitated and heated at about 135° C. at about 15 mm Hg vacuum for about 1.5 hours. The vacuum is then broken with nitrogen, and the remaining 189.6 grams (approximately) of the methyl ester mixture, along with about 1.4 grams of potassium carbonate are added to the reaction mixture. This mixture is reacted at about 135° C. under about 0.5–5.1 mm Hg vacuum for about 5 hours. The mixture is cooled to about 75° C., and about 30 grams of water are added to the mixture. The mixture is transferred to jars and centrifuged (Fischer Scientific Model Marathon 10K Centrifuge) at about 2500 RPM for about 2 minutes. The liquid in the jars is then decanted from the soap layer at the bottom. About 5 grams of silica are added to the decanted liquid, and the mixture is stirred for about 30 minutes at about 75° C. The mixture is then filtered through filter paper using a Buchner funnel. The filtrate is then fed through a Pope 2-inch diameter wiped film evaporator at approximately 30 grams/hour to distill the unreacted methyl esters. The evaporator operates at about 235° C. under about 0.04–0.05 mm Hg. The product is then collected from the evaporator and cooled to ambient temperature.

The resulting solid sucrose polyester product is about 53.0% polymer and about 47% monomer. The polymer material comprises about 19.8% dimer, about 11.8% trimer and about 21.4% tetramer and higher. 16.8% of the product is octaester.

Fat Composition Preparation

Figure 2:
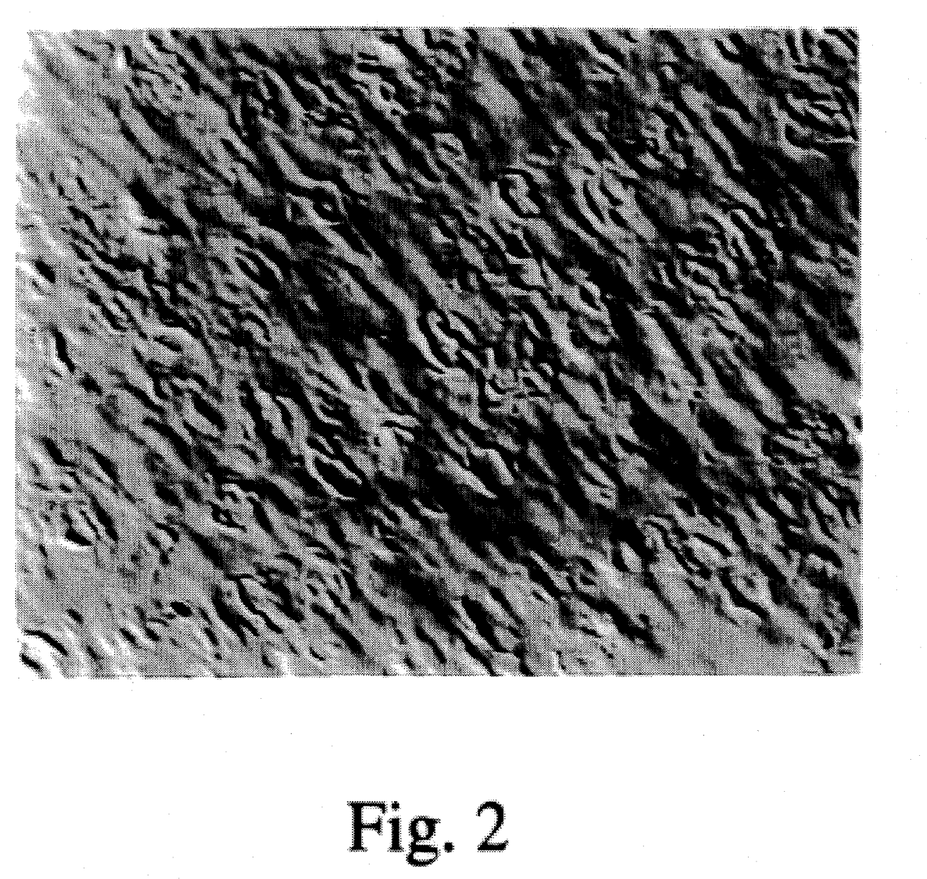
FIG. 2 is a photomicrograph (magnification 1000×) depicting particles of solid sucrose polyester polymer/monomer blends dispersed in a liquid sucrose polyester.

Four grams of this solid sucrose polyester product and 96 grams of liquid sucrose polyester, in which the sucrose is substantially completely esterified with fatty acid groups of cottonseed oil, are mixed and heated until all the solids are dissolved. The mixture is then cooled back to room temperature at a rate of 33.3° F./min. The cooling brings about crystallization of the solid sucrose polyester material in the form of small, platelet-like particles which are dispersed in the liquid nondigestible oil. FIG. 2 is a photomicrograph depicting the two-dimensional, platelet-like structure of these solid sucrose polyester particles dispersed in the liquid sucrose polyester material. The particles have a thickness of less than 25 nm as measured by Freeze Fracture TEM described hereinbefore in the Analytical Methods section.

The nondigestible fat composition of this Example I comprising the solid particles of sucrose polyester dispersed in the liquid sucrose polyester has an SFC profile slope of −0.1 as determined by the method described hereinbefore in the Analytical Methods section. This Example I composition is suitable for use as a food fat, and does not present the passive oil loss problem which would otherwise result if only the liquid sucrose polyester were to be used as a food fat. Also, as a result of the low solids levels used to prepare the Example I fat composition, food products made from this fat composition are not unacceptably waxy tasting.

The liquid sucrose polyester, the solid sucrose polyester and the starting materials for the solid sucrose polyesters have the attributes shown in Table I.

TABLE I

|  | BEHENIC METHYL ESTERS (%) | TALLOW | SOLID SUCROSE POLYESTER | LIQUID SUCROSE POLYESTER (%) |
|---|---|---|---|---|
| FATTY ACID CONTENT |  |  |  |  |
| $C_{14}$ | — | 6.0 | — | 0.2 |
| $C_{16}$ | 0.88 | 11.0 | 0.45 | 17.0 |
| $C_{18}$ | 1.4 | <1.0 | 1.65 | 5.3 |
| $C_{18:1}$ | — | 73.0 | — | 36.8 |
| $C_{18:2}$ | — | 8.0 | — | 38.4 |
| $C_{18:3}$ | — | 1.0 | — | 0.4 |
| $C_{20}$ | 4.37 | — | 6.61 | — |
| $C_{22}$ | 91.66 | — | 82.54 | — |
| $C_{24}$ | 1.53 | — | 0.08 | — |
| Dimer Fatty Acid | — | — | 8.30 | — |
| Other | — | 1.0 | 0.20 | 0.1 |
| ESTER DISTRIBUTION |  |  |  |  |
| % Octa | **** | **** | **** | 78.8 |
| % Hepta | **** | **** | **** | 20.8 |
| % Hexa | **** | **** | **** | <0.1 |
| % Lower | **** | **** | **** | 0.3 |

**** = not applicable

EXAMPLE II

Solid Sucrose Polyester Preparation

Solid sucrose polyester material for use in a nondigestible fat composition is prepared by reacting sucrose with the methyl esters of behenic acid and dimerized distilled tallow fatty acids.

Behenic acid methyl esters are prepared from hydrogenated high erucic acid rapeseed oil (HEAR) in a procedure similar to that described in Example I, except that no fractionation column is used. At the end of the final water wash step, the reflux condenser is removed, vacuum is applied to the reactor, and the residual water and methanol are evaporated. The methyl esters are heated to about 170°–200° C. under about 0.4–1.4 mm Hg vacuum and flash distilled. During distillation, only about 2% of the first material to distill is collected and discarded, while the next 90% is collected as product. About 36.4 grams of dimer methyl esters described in Example I are mixed with about 300 grams of the hydrogenated HEAR methyl esters. The molar ratio of dimer fatty acid to hardened HEAR is 0.5:7.5. About 168.2 grams of this methyl ester mixture are added to a 1-liter spherical glass reactor along with about 34.4 grams of powdered sucrose, about 24 grams of powdered potassium stearate and about 1.4 grams of powdered potassium carbonate. The mixture is agitated and heated at about 135° C. at about 15 mm Hg vacuum for about 1.5 hours. After about 1.5 hours, the vacuum is broken with nitrogen, and the remaining 168.2 grams (approximately) of the methyl ester mixture, along with about 1.4 grams of potassium carbonate are added to the reaction mixture. This mixture is reacted at about 135° C. under about 0.4–5.2 mm Hg vacuum for about 5 hours. The reaction product is finished and refined in a manner described in Example I.

The resulting solid sucrose polyester product is about 36.8% polymer and about 63.2% monomer. The polymer material comprises about 21.2% dimer, about 8.8% trimer, and about 6.9% tetramer and higher. The solid sucrose polyester also has the following properties: 44.3%, octaester, Saponification Value 177.6, Hydroxyl Value 16.6, Acid Value 0. The fatty acid composition of the solid sucrose polyester is shown in Table II.

TABLE II

| FATTY ACID COMPOSITION | SOLID SUCROSE POLYESTER % |
|---|---|
| $C_{14}$ | 0.04 |
| $C_{16}$ | 3.55 |
| $C_{18}$ | 45.57 |
| $C_{20}$ | 10.71 |
| $C_{22}$ | 36.39 |
| $C_{24}$ | 0.46 |
| Dimer Fatty Acid | 3.07 |
| Other | 0.31 |

Fat Composition Preparation

Four grams of this solid polyol polyester are added to 96 grams of a liquid sucrose polyester of the type described in Example I. The mixture is heated until all of the solids are dissolved, and then cooled back to room temperature at a rate of 33.3° F./min. to form a plastic fat composition consisting of 4% solid sucrose polyester and 96% liquid sucrose polyester. This composition is suitable for use as a food fat and does not present the passive oil loss problem which would otherwise result if only the liquid sucrose polyester were to be used as a food fat. Also, as a result of the low solids levels used to prepare the Example II fat composition, food products made from this fat composition are not unacceptably waxy tasting.

EXAMPLE III

Solid Sucrose Polyester Preparation

Solid sucrose polyester material for use in a nondigestible fat composition is prepared by reacting the HEAR oil methyl esters with sucrose, polymerizing them, and hardening them.

HEAR oil methyl esters are prepared from (non-hardened) high erucic acid rapeseed oil (HEAR) in a procedure similar to that described in Example I, except that during the distillation, only about 2% of the first material to distill is collected and discarded, while the remaining 90% is collected as product. The methyl esters have the compositions set forth in Table III.

About 320 grams of these HEAR methyl esters are added to a 3-liter glass reactor along with about 68.8 grams of powdered sucrose, about 48 grams of powdered potassium stearate and about 2.8 grams of powdered potassium carbonate. The reactor has a heating mantle, thermometer, temperature controller, variable speed agitator, vacuum take-off, and bottom outlet. The mixture is agitated and heated at about 135° C. at about 15 mm Hg vacuum for about 1.5 hours. After about 1.5 hours, the vacuum is broken with nitrogen, an additional 320 grams (approximately) of HEAR methyl esters, along with about 1.4 grams of potassium carbonate are added to the reaction mixture. This mixture is reacted at about 135° C. under about 1.2–7.4 mm Hg vacuum for about 5 hours. The reaction product is finished and refined in a manner similar to that described in Example I.

The refined HEAR sucrose polyester is added to a glass, stirred reactor, and stirred at atmospheric pressure and 185° C. for 10 hours to partially polymerize the material. Some of the partially polymerized sucrose polyester is then added to a 600 ml Parr stainless steel stirred autoclave along with about 2% supported nickel catalyst (United Catalyst). The reactor is pressurized with hydrogen to about 250 psig, and mixture is stirred at this pressure and about 400° C. for about 3 hours. The reactor is then de-pressurized, the mixture removed and filtered (to remove the catalyst), and cooled to ambient temperature. The resulting product is polymer/$C_{18-22}$ sucrose polyester solid.

This solid sucrose polyester product is about 14.6% polymer material and about 85.4% monomer. The polymer material comprises about 10.8% dimer and about 3.8% trimer. The solid polyol polyester product has an octaester content of 67.4%. The Hydroxyl Value of the solid sucrose polyester product is 14.2, the Saponification Value is 167.1, and the Acid Value is 1.9. The fatty acid composition of the solid sucrose polyester is shown in Table III.

Fat Composition Preparation

Four grams of this solid polyol polyester are added to 96 grams of the liquid sucrose polyester described in Example I. The mixture is heated until all of the solids are dissolved, and then cooled back to room temperature at a rate of 33.3° F. to form a plastic fat composition consisting of 4% solid sucrose polyester and 96% liquid sucrose polyester. This composition is suitable for use as a food fat and does not present the passive oil loss problem which would otherwise result if only the liquid sucrose polyester were to be used as a food fat. Also, as a result of the low solids levels used to prepare the Example III fat composition, food products made from this fat composition are not unacceptably waxy tasting.

TABLE III

| | HEAR Oil Methyl Ester Components | Solid Sucrose Polyester |
|---|---|---|
| $C_8$ | — | — |
| $C_{10}$ | — | — |
| $C_{12}$ | — | 0.24 |
| $C_{14}$ | — | 2.12 |
| $C_{16}$ | 3.1 | 3.08 |
| $C_{18:0}$ | 1.1 | 38.26 |

TABLE III-continued

| | HEAR Oil Methyl Ester Components | Solid Sucrose Polyester |
|---|---|---|
| $C_{18:1}$ | 13.0 | — |
| $C_{18:2}$ | 14.7 | — |
| $C_{18:3}$ | 7.2 | — |
| $C_{20}$ | 7.8 | 7.90 |
| $C_{22}$ | 47.9 | 43.48 |
| $C_{24}$ | 1.6 | 0.79 |
| Dimer Fatty Acid | — | 3.62 |
| Other | 0.6 | 0.57 |

EXAMPLE IV

Norchip potatoes are used which have been sliced to a thickness of about 0.052 inches (0.13 cm). The sliced potatoes are fried in a 5 pound batch fryer at a temperature of 365° F. (185° C.) for 3 minutes. Approximately 225 potato chips are fried in each of the fat compositions of Examples I, II, and III.

Ingestion of these potato chips which contain the nondigestible fat compositions will not result in passive oil loss, and the potato chips are not unacceptably waxy tasting.

EXAMPLE V

Solid sucrose polyester material for use in the nondigestible fat compositions of the present invention is prepared by reacting HEAR oil methyl esters with sucrose, polymerizing the HEAR sucrose polyester, and hardening the polymerized sucrose polyester.

HEAR oil methyl esters are prepared from (non-hardened) high erucic acid rapeseed oil (HEAR) in a procedure similar to that used to prepare the behenic acid methyl esters in Example I. The HEAR methyl esters are fractionally distilled to increase the $C_{22:1}$ content. These HEAR methyl esters reacted with sucrose to make HEAR sucrose polyester in a procedure similar to that used in Example III. The chainlength distribution and of the HEAR sucrose polyester is shown in Table Va. This sucrose polyester is about 85% sucrose octaester, with the remaining being sucrose hepta and hexaesters.

TABLE V(a)

| | |
|---|---|
| $C_8$ | 0 |
| $C_{10}$ | 0 |
| $C_{12}$ | 0 |
| $C_{14}$ | 0 |
| $C_{16}$ | 0.2 |
| $C_{18:0}$ | 0.3 |
| $C_{18:1}$ | 1.8 |
| $C_{18:2}$ | 1.5 |
| $C_{18:3}$ | 0.0 |
| $C_{20:0}$ | 0.7 |
| $C_{20:1}$ | 6.5 |
| $C_{22:0}$ | 1.3 |
| $C_{22:1}$ | 82.9 |
| $C_{24}$ | 2.9 |

The HEAR sucrose polyester is polymerized by the following procedure, using the following equipment:

1. 22-liter glass reactor containing inlets for nitrogen, thermometer, condenser, and agitator shaft.
2. Glass condenser is attached to reactor through the appropriate inlet, using cooling water.
3. Electric heating mantle is connected to temperature controller and variac power controller.
4. Electric stirring motor connected to glass stir rod and Teflon stir paddle.
5. Glass vapor traps immersed in dry ice.
6. Vacuum pump Approximately 12032 grams of HEAR sucrose polyester and approximately 661 grams of di-tert-butyl peroxide are charged to the reactor and heated with agitation to about 40° C. As the material is heated to 80° C., a vacuum is drawn on the reaction vessel for about 10 minutes to remove any residual air or water. When the temperature reaches about 80° C., the t-butyl peroxide is added slowly to the reactor. The mixture is then heated to about 135° C. and agitated for about 2.0 hours. During this time the progress of the reaction is monitored using a liquid chromatograph for polymer analysis. The reaction time may vary depending on desired polymer level in the finished product. The approximate composition of the product of this polymerization is shown in Table V(b). At the end of the reaction, a vacuum is applied to the reactor to remove residual di-t-butyl peroxide and t-butyl alcohol. The product is discharged from the bottom of the reactor into properly labeled food approved storage containers.

TABLE V(b)

| | |
|---|---|
| Monomer HEAR SPE | 65% |
| Dimer HEAR SPE | 15% |
| Trimer HEAR SPE | 9% |
| Tetramer and higher polymer | 11% |

The polymerized HEAR sucrose polyester is next hydrogenated by the following procedure, using the following equipment:

1. 25 lb. capacity stainless steel hydrogenation reactor with agitator, hydrogen supply and steam heating coil.
2. Stainless steel beakers for mixing catalyst slurry.
3. Stainless steel pressure vessel to feed material to filter.
4. Stainless steel pressure filter apparatus.
5. 0.45 micron, 10 inch, nylon cartridge filter.

Approximately 12000 grams of the liquid HEAR sucrose polyester polymer, is charged into the 25 lb. hydrogenation reactor. Approximately 120 grams of Englehard Ni 5136-P powdered nickel catalyst is slurried with the HEAR liquid and added to the vessel. The mixture is heated with agitation to about 400° F. and kept under nitrogen. At the set temperature, the gas is switched from nitrogen to hydrogen. The material is agitated at 400° F. with a hydrogen sparge for about 4 hours. The reaction progress is monitored by measuring the refractive index of the oil. The finished product is discharged from the bottom of the vessel into a stainless steel storage vessel. The final product has an I.V. (iodine value) of approximately 5.

The product is collected from the hydrogenation reactor, then added to the stainless steel pressure vessel. The pressure vessel is heated to melt the solid material. The cartridge filter is assembled and connected to the pressurized storage vessel. The nickel is filtered from the material under about 25 psi pressure, and the product is collected in clean glass jars. The resulting material is a white solid, with a residual nickel value of about 0.09 ppm.

Approximately 9100 grams of the hydrogenated, polymerized HEAR SPE is added to a 20 lb. capacity stainless steel batch deodorizer. The material is heated to about 350° F. and steam stripped for about 3 hours. Then the product is cooled to about 200° F. and is discharged into a properly labeled container. The product is a bland-smelling, bland-tasting white solid with a P.V. (peroxide value) of about 22.

No di-tert-butyl peroxide or tert-butanol were detectable by headspace gas chromatographic analysis of the product.

EXAMPLE VI

This example is intended to show that di-t-butyl peroxide is a superior free radical initiator for making a food-grade polyol polyester polymer, because it does not attach to fatty chains (making branched fatty acids) as other free radical initiators can.

HEAR sucrose polyester is prepared as described in Example V.

(a) About 250 grams of the HEAR sucrose polyester is added to a 1-liter glass reactor that is equipped with a heating mantle, temperature controller, reflux condenser, agitator, and nitrogen source. A vacuum is pulled on the system for about 10 minutes at about 25° C. to remove any water. The HEAR sucrose polyester is then heated to about 80° C., and about 10 grams of di-t-butyl peroxide are added to the reactor. The mixture is then heated to 135° C. with agitation, for about 4 hours, refluxing the boiling t-butyl peroxide with the reflux condenser. After about 5 hours, the HEAR sucrose polyester contains about 56% polyol polyester polymer. Vacuum is then applied to the reactor to remove residual di-t-butyl peroxide, and t-butyl alcohol. A portion of the sample is transesterified with sodium methoxide in methanol. The resulting fatty acid methyl esters are then analyzed by GC/MS. There is no indication of any t-butyl ether containing species in the methyl esters. The detection limit for this procedure is 0.05%.

(b) About 300 grams of the HEAR sucrose polyester is added to a 1-liter glass reactor that is equipped with a heating mantle, temperature controller, reflux condenser, agitator, and nitrogen source. A vacuum is pulled on the system for about 10 minutes at about 25° C. to remove any water. The HEAR sucrose polyester is then heated to about 100° C., and about 15 grams of benzoyl peroxide are added to the reactor. The mixture is then heated at about 100° C. with agitation, for about 1 hour. After about 1 hours, the HEAR sucrose polyester contains about 40% polyol polyester polymer. Residual benzoyl peroxide is converted to benzoic acid and the benzoic acid is removed by repeated extraction with aqueous base. The reaction mixture is dissolved in 450 ml of a solution containing 3 parts of glacial acetic acid and 2 parts 1,1,2-trichlorotrifluoroethane. The mixture is heated to 110°–120° F. with stirring and then 10 ml of saturated potassium iodide in water solution is added and the mixture stirred for 5 minutes. 1500 ml of deionized water and 620 ml of 0.1N sodium thiosulfate solution is then added and the mixture stirred for an additional 10 minutes. The aqueous phase is allowed to settle and is discarded. The organic phase is washed with 3–500 ml portions of 0.1N sodium hydroxide solution and 3–500 ml portions of deionized water. The organic phase is dried with anhydrous magnesium sulfate, filtered and the solvent is removed in a rotary evaporator. Titration of a portion of the material shows less than 200 ppm residual benzoic acid and the material has a peroxide value of zero.

Analysis of the polymerized polyol product by 1 H NMR showed intense resonances in the aromatic region (below 6.8 ppm) indicating the incorporation of benzoyl radicals into the product. A portion of the sample is transesterified with sodium methoxide in methanol. The fatty acid methyl esters are then silylated with bis(trimethylsilyl)trifluoroacetamide. The resulting materials are then analyzed by GC/MS. Much methyl benzoate is seen in the early part of the chromatogram. In addition, a homologous series of saturated methyl esters containing an O-TMS groups on the fatty chains are observed. The NMR and GC/MS data are consistent with the addition of benzoyl radicals to some of the double bonds of the fatty chains during the original reaction.

What is claimed is:

1. A process for preparing nondigestible solid particles of polyol polyester material having a complete melting point above about 37° C., wherein said polyol polyester material comprises from about 10% to 50% of a polyol polyester polymer component and from 50% to about 90% of a polyol polyester monomer component, wherein at least 45% of the hydroxyl groups of the polyol polyester material are esterified with $C_{20}$ and higher saturated fatty acid radicals, and wherein said polyol polyester material is prepared from polyol having at least 4 hydroxy groups and wherein at least 4 of the hydroxy groups are esterified, and wherein the polyol polyester polymer component has an Iodine Value of less than about 20, which process comprises the steps of:

A. reacting high erucic acid rapeseed oil by conventional methanolysis to form high erucic acid rapeseed methyl esters;

B. reacting the high erucic acid rapeseed methyl esters with a polyol to form high erucic acid rapeseed polyol polyesters;

C. reacting the high erucic acid rapeseed polyol polyesters with di-t-butyl peroxide to partially polymerize the polyol polyesters; and D. hardening the polyol polyesters to an Iodine Value of less than about 20.

2. The process of claim 1 wherein after step A the high erucic acid rapeseed methyl esters are fractionally distilled to increase the level of $C_{20}$ and higher saturated fatty acid methyl esters to at least about 90%.

3. The process of claim 2 wherein the polyol polyester is hardened to an Iodine Value of less than 10.

4. The process of claim 2 wherein said polyol is selected from the group consisting of sugars, sugar alcohols, sugar derivatives, polyglycerols and polyvinyl alcohols.

5. The process of claim 2 wherein said polyol polyester material is a sucrose polyester having at least 4 ester groups.

6. A process according to claim 5 wherein said sucrose polyester has from about 7 to 8 ester groups.

* * * * *